United States Patent Office 3,501,536
Patented Mar. 17, 1970

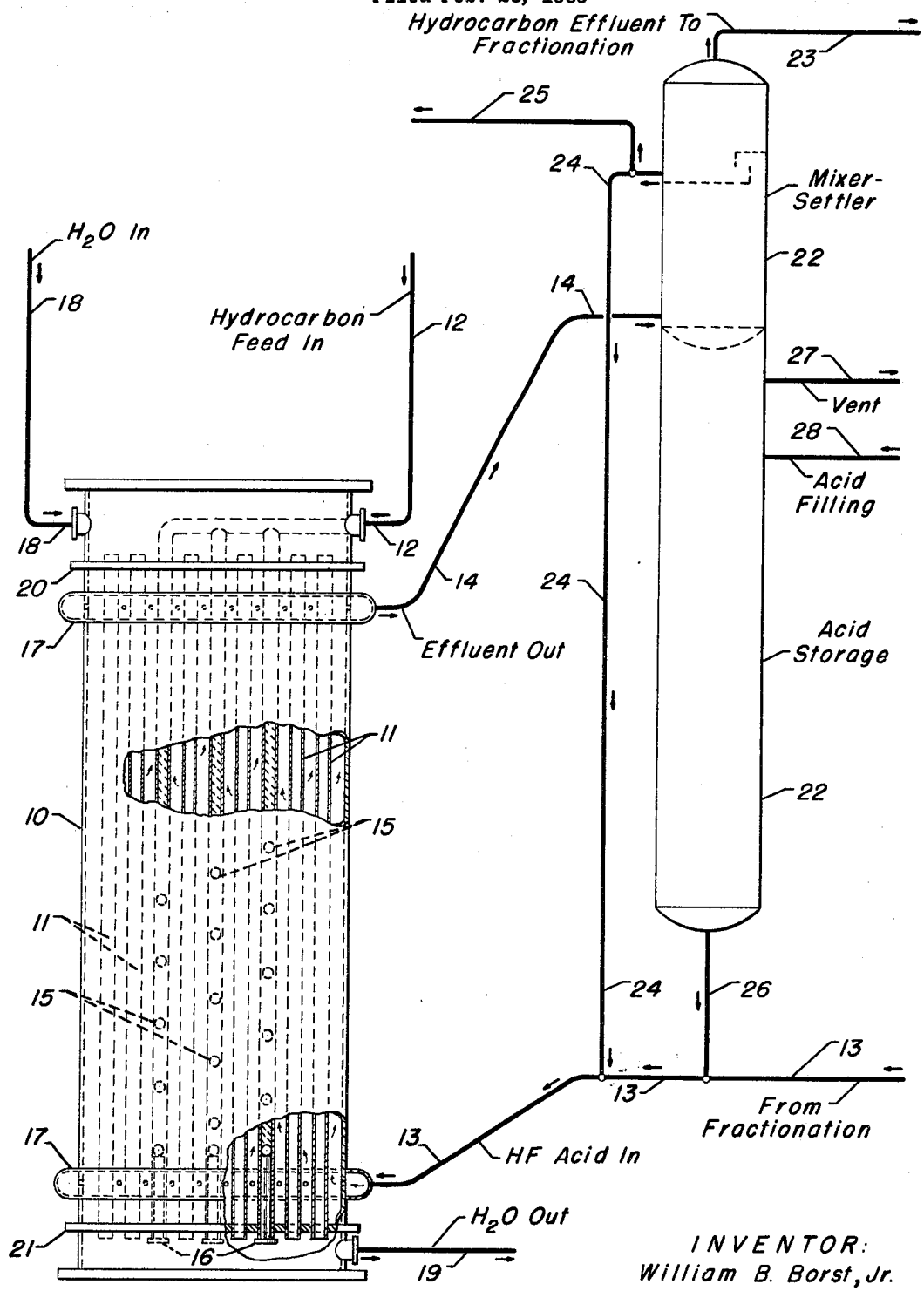

3,501,536
ALKYLATION WITH SPIRALLING FLOW PATH OF REACTANTS AND ALKYLATE
William B. Borst, Jr., Mount Prospect, Ill., assignor to Universal Oil Products Company, Des Plaines, Ill., a corporation of Delaware
Continuation-in-part of application Ser. No. 581,600, Sept. 23, 1966. This application Feb. 26, 1969, Ser. No. 802,424
Int. Cl. C07c 3/54; B01j 11/00, 1/00
U.S. Cl. 260—683.48                              9 Claims

ABSTRACT OF THE DISCLOSURE

Alkylation process utilizes a reactor with heat exchange tubes and with a plurality of conduits, or tubes, which carry the hydrocarbon reactants into the reactor space for intimate mixing and cooling of the reactants and catalyst. The reactants enter the reactor through a series of spaced openings in the tubes which jet the reactants into an upwardly spiraling flow path around the heat exchange tubes.

CROSS-REFERENCE TO RELATED APPLICATION

This application is a continuation-in-part of my copending application Ser. No. 581,600 filed Sept. 23, 1966 now U.S. Patent 3,469,949, issued Sept. 30, 1969.

BACKGROUND OF THE INVENTION

This invention relates to a catalytic alkylation process. It particularly relates to an improved process for the production of an isoparaffin-olefin reaction product. It specifically relates to a process for the alkylation of an isobutane stream with a butylene stream using hydrofluoric acid (HF) as the catalyst.

Production of higher molecular weight isoparaffins having valuable anti-knock properties as motor fuel is of considerable importance in the petroleum refining industry. Furthermore, the introduction of automobile engines of high compression ratio has necessitated the utilization of high anti-knock fuel in these engines to obtain efficiency therefrom. Thus, the demand for higher and higher octane number fuels has led to the increased use of higher molecular weight isoparaffins as blending agents in gasoline.

A convenient source of such higher molecular weight isoparaffins is the catalytic alkylation of lower boiling isoparaffins, such as isobutane, with olefin hydrocarbons, such as, for example, propylene, the butylenes, the amylenes, and various mixtures thereof.

It is well known in the prior art that catalytic alkylation using, for example, hydrofluoric acid as a catalyst has become an important chemical tool for preparing alkylated hydrocarbons and derivatives thereof. There have been numerous process schemes advanced by the prior art for accomplishing the alkylation reactor, but it is extremely difficult to achieve a process scheme which embodies all of the desirable features of a completely optimum reaction. Optimizing the alkylation reaction is complicated by the fact that the alkylation reaction, if not carried out properly, has many side reactions, such as polymerization, which destroy the effectiveness of the reaction and inhibits the production of commercial quantities of desired alkylates. Additionally, in order for the reaction to be carried out commercially, a tremendous amount of auxiliary equipment for the recovery of the alkylate product and for the regeneration and reuse of the excess catalyst and excess reactants which have passed through the reaction system is required.

A particular difficulty with the alkylation reaction as practiced by those skilled in the art is that the reaction itself effects a rapid evolution of heat which causes local overheating within a typical reaction vessel. Such local overheating is injurious to the quality of the alkylate produced and, in some cases, is injurious to the yield of the alkylate produced. Therefore, it is highly desirable to effect a reaction vessel which has the ability of removing the exothermic heat of reaction as rapidly as possible in order to avoid localized overheating. Another important difficulty with the alkylation reaction is that the catalyst and reactants are substantially immiscible fluids. Accordingly, to optimize the reaction requires that optimum mixing of the catalyst and reactants be arranged. Therefore, another desirable feature of a reaction vessel would be to provide means for intimately mixing two substantially immiscible fluids while simultaneously providing control over the reaction such as by removing the exothermic heat of reaction as rapidly and efficiently as possible.

SUMMARY OF THE INVENTION

It is an object of this invention to provide a process for carrying out a catalytic alkylation reaction.

It is also an object of this invention to provide an apparatus in my process for carrying out a catalytic alkylation reaction in a more facile and economical manner.

It is still another object of this invention to provide an alkylation process wherein hydrogen fluoride is used as the catalyst.

It is still a further object of this invention to provide a process and appartaus for producing an isobutane-olefin reaction product in a more facile and economical manner than has heretofore been achieved.

The present invention provides a process for producing alkylated hydrocarbons which comprises the steps of: (a) admixing an olefin feed reactant with an isoparaffin feed reactant; (b) passing said admixture into a reaction zone comprising a vertically disposed, enclosed shell having a tube sheet spaced from each end of the shell defining a space between each tube sheet and said shell, a plurality of tubular heat exchange means supported at each end by a tube sheet, said heat exchange means uniformly spaced within said shell and extending longitudinally between and through each tube sheet in fluid communication with said space between said tube sheet and said shell, first inlet means extending into a lower portion between said tube sheets, outlet means communicating with the upper portion of said space, and second inlet means connecting to a plurality of conduits which extend longitudinally between said tube sheets and are spaced in adjacent, parallel relationship to said heat exchange means, said conduits having a plurlity of openings longitudinally spaced in each of said conduits and arranged therein to form a series of consecutively advancing openings with each adjacent conduit whereby a fluid discharged from said openings forms a spiraling flow path; (c) introducing catalyst in liquid phase into said heat exchange means at one end thereof under conditions sufficient to effect reaction between said reactants thereby creating an upwardly spiraling flow path of alkylated hydrocarbons around said heat exchange means; (d) withdrawing from the other end of said zone a reaction effluent comprising alkylated hydrocarbons, unreacted isoparaffin reactant, and catalyst; (e) passing the effluent into the uppermost compartment of a multi-compartmented, vertically disposed vessel comprising at least an uppermost compartment for settling said effluent and a lower compartment for storing fresh catalyst, each of said compartments being located at an elevation above the reaction zone; (f) maintaining in said uppermost compartment conditions such that said effluent separates into a predominantly hydrocarbon phase containing alkylated hydrocarbons and a predominantly catalyst phase;

(g) withdrawing from the uppermost compartment said hydrocarbon phase and said catalyst phase as separate streams; and (h) returning said catalyst phase by gravity flow to said reaction zone as in Step (c) without intervening cooling thereof.

As will be described hereinafter in greater detail, the present invention provides a process for producing alkylated hydrocarbons utilizing the hydrogen fluoride catalyst and an apparatus for carrying out the alkylation reaction in a more facile and economical manner. The essence of my invention embodies a shell and tube heat exchanger wherein at least part of the tubes of the heat exchanger carry the hydrocarbon feed reactant into the space between the tubes and the shell for reaction by passing these reactants through a series of spaced openings in the tubes which jet the reactants into an upwardly spiraling flow path from the opening around the heat exchanger tubes into a moving flow path of hydrogen fluoride catalyst which has been passed to the shell side of the exchanger. My invention is founded upon a series of interrelated process steps acting cooperatively to make up a unitary alkylation system including my reaction zone apparatus which provides excellent control of temperature at the point of heat evolution in my novel process system. As stated above, this invention relates to an improved process and apparatus for the production of an isoparaffin-olefin reaction product. Although the present process is particularly applicable to the alkylation of an isobutane hydrocarbon with a butylene hydrocarbon, it is also applicable to other isoparaffinic and other olefinic hydrocarbon feedstocks. Thus, other paraffinic hydrocarbons, such as isopentane, one or more of the isoheptanes, or mixtures of the aforementioned isoparaffin branched-chain heptanes and other aliphatic hydrocarbons of branched-type and chain structure may be utilized as a feedstock. Similarly, as olefinic hydrocarbons, reactants, the normally gaseous olefin hydrocarbons including propylene, 1-butylene, 2-butylene, isobutylene, the isomeric amylenes, the hexenes, the heptenes, and other higher molecular weight olefinic hydrocarbons may be utilized as olefin hydrocarbon reactant in my process.

The alkylation reaction occurs at temperatures from 0° F. to about 200° F., preferably from about 30° F. to about 110° F. Generally, the heat of reaction must be removed from the reactor; therefore, heat exchange means, such as an internal cooler or heat exchanger, is commonly employed within the reactor itself. It is a feature of my invention that my alkylation reactor provides some of the tubes for cooling and other tubes provide a means for introducing the feed reactor into a bath or heat sink of catalyst whereby excellent control of the reaction temperature is achieved and excellent efficiency of reaction is achieved through intimate mixing of the reactants and catalyst.

The pressure on the alkylation system is ordinarily just high enough to maintain the hydrocarbon and catalyst in substantially liquid phase. Suitable pressures would range from about atmospheric to about 40 atmospheres or more. Typically, the pressure will be in the range of from about 200 p.s.i.g. for the case of butylene alkylation with isobutane. The contact time in the alkylation reactor conveniently will be less than five minutes and preferably less than about two minutes.

The alkylation reaction is conducted in the presence of a catalyst such as hydrogen fluoride, generally in an amount sufficient to provide a catalyst-to-hydrocarbon volume ratio in the alkylation reactor of about 0.5 to about 2.5. Similarly, in order to reduce the tendency of the olefinic portion of the feed mixture to undergo polymerization prior to alkylation, the molar proportion of isoparaffin hydrocarbon to olefin hydrocarbon in the alkylation reactor is generally maintained at a value greater than 1 up to about 20:1, preferably from about 3:1 to about 15:1.

It is to be noted from the description of the present invention that the reaction zone design is of a tubular type, that is, it is a shell housing a series of tubes running between an upper and lower tube sheet. It is evident that with this arrangement the distribution of the two immiscible fluids becomes extremely important. A "spider" arrangement is not applicable since such a distribution means cannot be physically inserted into a reactor of a tubular type. The prior art has attempted to overcome the difficulties in reactor design by developing processing schemes whereby the catalyst and hydrocarbon reactants are brought together in a mixing zone which has external cooling means, using eductors for mixing and heat transfer, or using multiple feed inlets into the reactor so that localized overheating might be avoided. In each of these prior art schemes, the methods for controlling the temperature within the reactor have generally been unsatisfactory.

Accordingly, it is noted that the present invention provides for the mixing of the hydrocarbon reactant and catalyst in an upwardly spiraling flow path from the opening. The flow path circles around the heat exchange tubes thereby effecting control at the point of heat evolution of the temperatures. Such an arrangement of course, keeps local overheating to a minimum and decreases the amount of heat sink used for circulation, thereby significantly decreasing the operating cost of the system.

My invention is uniquely applicable to the system whereby the settled acid from a mixer-settler is returned to the reaction zone by gravity flow or in an uninhibited free-flowing manner. Since complicated mixing devices have been eliminated, the pressure drop through the reactor is at a minimum thereby decreasing the necessity for pumps, valves, and the like, for controlling the flow of the acid into the reactor. Also, the elimination of pumps, flanges, and valves also eliminates the danger of acid leakage and spillage thereby increasing the safety aspects of my alkylation process.

My alkylation reactor design contemplates the utilization of tubes running between the tube sheets that are nominally one inch in diameter and the tubes may be up to 20 feet in length or longer. For a one inch diameter tube, the perforations or orifice-type openings which are placed in the feed tubes are placed in a spiral manner along the length of an individual tube with an opening appearing every ½ to 6 inches, preferably about 2 inches apart. The diameters of the openings may range from $\frac{1}{16}$ to $\frac{3}{16}$ inch, preferably, approximately $\frac{1}{8}$ inch in diameter for the 1 inch diameter tube size. Those skilled in the art will know how to tailor the distance between the holes and the diameter of the holes to obtain an optimum result for a particular reactor design. It is important, however, that the configuration of the holes be designed such that the hydrocarbon reactants are jetted into the catalyst sink at a velocity through the holes in the range of from about 5 to about 55 feet per second, preferably in a range of about 30 feet per second. Additionally, the geometry of the openings should be such that there is no impingement of the hydrocarbon reactants against an adjacent heat exchange tube. A convenient way of specifying the latter requirement is that no opening occurs in the hydrocarbon conduit in line-of-sight with a respective adjacent heat exchange tube.

Since the alkylation reaction is relatively rapid in terms of time, the present invention is satisfactorily operated if the openings are placed in the feed tubes over a length of no more than 75% of the total length of the tube in contact with the acid phase as measured from the entry point for the acid.

My invention can be most clearly described and illustrated with reference to the attached drawing which is a schematic representation of one specific embodiment of my invention.

DESCRIPTION OF THE DRAWING

Referring now to the drawing, an olefin-containing feedstock is commingled with an isoparaffin feedstock to form an alkylation hydrocarbon feed mixture in line 12. The alkylation feed mixture is passed from line 12 into reactor 10 through a plurality of conduits 15 which are placed in adjacent, parallel relationship with heat exchange tube 11. It is noted that all of the tubes run between tube sheets 20 and 21. The hydrocarbon feed tubes are perforated at the lower end in order to distribute the feed in a spiral zone preferably in the lower two-thirds of the reactor. The feed hydocarbon tubes 15 may be conventional tubes having plug 16 therein and fastened to tube sheet 21 in a conventional manner by means well known to those skilled in the art.

Hydrofluoric acid catalyst enters one end of the reactor via line 13 and distribution means 17 which comprises a circumferential conduit placed in ring fashion around the external portion of the reactor 10 shell. Distributor 17 has a series of holes drilled through the conduit through the shell wall into the space between the tubes and the reactor shell for jetting the acid radially into such space. The acid phase passes upwardly filling the shell 10 and completely surrounding the heat exchange tubes and the feed inlet tubes 15. Cold water, in an amount sufficient to remove the heat of reaction evolved from the reaction, enters rector 10 via line 18 and exits reactor 10 via line 19. It is to be noted that at a point of the lowermost orifice opening feed conduit 15, as feed contacts the catalyst, the reaction occurs thereby evolving heat which is absorbed by the adjacent heat exchange tubes 11. By proceeding upwardly, a spiraling flow path of alkylated hydrocarbons swirls around the heat exchange tubes thereby effecting efficient removal of heat of reaction and preventing excellent control over the reaction temperature.

The combined reaction mixture, termed alkylation reaction effluent, is removed from reactor 10 via line 14 which passes to mixer-settler 22. The hydrocarbon and catalyst effluent from reactor 10 being passed via line 14 into mixer-settler 22 is passed into the uppermost compartment of a stacked vessel comprising at least an uppermost compartment for settling the total effluent from the reactor and a lower compartment for storing fresh acid used in the process. Preferably, each of these compartments are placed at an elevation above the elevation of the reaction zone so that the hereinafter specified catalyst streams can be returned to the reaction zone by gravity flow in an uninhibited, free-flowing manner. After the desired residence time in the uppermost compartment of a stacked vessel has been reached, the hydrocarbons and hydrogen fluoride catalyst separate into at least two distinct phases: an upper phase comprising alkylated hydrocarbons and a lower phase comprising catalyst. However, there is an interface disposed therebetween. The hydrocarbons include the alkylation product now substantially free from hydrogen fluoride and they are withdrawn from the uppermost compartment via line 23 for processing through a downstream fractionation train (not shown) in order to recover the unreacted hydrocarbons and to recover the desired alkylate product in substantially pure form.

The hydrogen fluoride catalyst which has been settled and separated is withdrawn from the uppermost compartment and recycled to the reactor via lines 24 and 13. A portion of the hydrogen fluoride catalyst removed from the settler from the mixer-settler can be passed to acid regeneration means via lines 24 and 25 for removal of tars and constant boiling mixture (CBM). The regenerated acid can also be returned to the reaction zone via line 13, if desired. Line 28, labeled acid filling, provides an entryway into the acid storage system. Line 27 is a vent for the acid storage section of the stacked vessel.

PREFERRED EMBODIMENT

In a particularly preferred embodiment of this invention, this invention provides a process for the production of an isoparaffin-olefin reaction product which comprises the steps of: (a) admixing an olefin feed reactant with isobutane to form an alkylation feed mixture comprising an isobutane-to-olefin molar ratio of from 1:1 to 20:1; (b) introducing said feed admixture into a reaction zone comprising a vertically disposed, enclosed shell having a tube sheet spaced from each end of the shell defining a space between each tube sheet and said shell, a plurality of tubular heat exchange means supported at each end by a tube sheet, said heat exchange means uniformly spaced within said shell and extending longitudinally between and through each tube sheet in fluid communication with said space between said tube sheet and said shell, first inlet means extending into a lower portion between said tube sheets, outlet means communicating with the upper portion of said space, and second inlet means connecting to a plurality of conduits which extend longitudinally between said tube sheets and are spaced in adjacent, parallel relationship with said heat exchange means, said conduits having a plurality of openings longitudinally spaced in each of said conduits and arranged therein to form a series of consecutively advancing openings with each adjacent conduit whereby a fluid discharged from said openings forms a spiraling flow path; (c) passing hereinafter specified hydrogen fluoride catalyst into said space through one end of said reaction zone thereby creating an upwardly spiraling flow path of alkylated hydrocarbons around said heat exchange means; (d) reacting said feed mixture in the presence of said catalyst under alkylation conditions including a catalyst-to-hydrocarbon volume ratio of from about 0.5 to 2.5; (e) removing a total effluent stream comprising said reaction product and said catalyst; (f) passing said total effluent into the uppermost compartment of a multi-compartmented, vertically disposed vessel comprising at least an uppermost compartment for settling said effluent and a lower compartment for storing fresh catalyst, each of said compartments being located at an elevation above the reaction zone; (g) maintaining in said uppermost compartment conditions such that said effluent separates into a hydrocarbon phase containing said reaction product and a hydrogen fluoride catalyst phase; (h) withdrawing from the uppermost compartment said hydrocarbon phase and said catalyst phase as separate streams; and, (i) returning catalyst phase in an uninhibited, free-flowing manner to said reaction zone without intervening cooling thereof.

THE EXAMPLE

A plant is operated in accordance with the flow scheme of the attached drawing top roduce 4,740 barrels per stream day (b./s.d.) of 7 lb. Reid vapor pressure alkylate having a research octane number (3 cc. TEL/bal.) of 105 with a hydrogen fluoride catalyst consumption of less than 0.2 lb. per barrel of alkylate produced. An olefin feed reactant is commingled at a rate of 4,220 b./s.d. with an isoparaffin feed reactant of 4,055 b./s.d. to form the alkylation feed mixture. The olefin feed composition is as follows:

| Component: | b./s.d. |
|---|---|
| Ethane | 7 |
| Propylene | 789 |
| Propane | 409 |
| Butylenes | 1491 |
| Isobutane | 918 |
| n-Butane | 357 |
| Amylenes | 150 |
| Isopentane | 99 |
| Total | 4220 |

The isoparaffin feed reactant comprises the following components:

| Component: | b./s.d. |
|---|---|
| Propane | 182 |
| Isobutane | 2112 |
| n-Butane | 1694 |
| Isopentane | 67 |
| Total | 4055 |

The alkylation feed mixture is mixed with 47,280 b./s.d. of isobutane recycle from means not shown on the drawing for a combined feed to the reactor of 55,555 b./s.d. This combined feed is charged through the reactor so that the velocity through the openings is about 30 feet per second. Approximately 54,350 b./s.d. of hydrogen fluoride catalyst is also added to the reactor. The reactor operating conditions are maintained so that the isobutane to olefin molar ratio is 13, the catalyst to hydrocarbon volume ratio is 1.0, the reactor temperature is 100° F. and the reactor pressure is maintained at 217 p.s.i.g.

The effluent from the reactor is passed via line 14 to mixer-settler 22, which is located above the reactor, at a rate of 108,940 b./s.d. After settling and separation of the acid phase from the hydrocarbon phase, 54,280 b./s.d. of hydrocarbon phase is removed from the settler via line 23 for conventional processing to recover the isobutane from recycle and to remove the alkylate product having the quality previously mentioned. The acid phase at a rate of 54,340 b./s.d. is removed from the mixer-settler via line 24 and recycled to reactor 10 by gravity flow via lines 24 and 13. No external pumping energy is used and the flow is uninhibited and free-flowing with no control valves or obstructions of any kind being in the return line. The flow of the acid from the settler is the result of the energy imparted by its elevation, aided by the difference in density between the acid phase and the total effluent from the reactor, and energy imparted by the flowing hydrocarbons in the reactor which are pumped into the system. However, it is noted that there is no pump on the acid phase thereby increasing the safety and decreasing the maintenance cost for the operation. A portion of the acid from mixer-settler 22 is passed to an acid regenerator (not shown) via lines 24 and 25 for removal of tars, etc. The purified acid from the regenerator and the acid subsequently recovered in the conventional fractionation train associated with the reactor is returned to the reactor via line 13 to produce a total acid return stream of 54,350 b./s.d.

Reactor 10 is a shell reactor vessel having internal water cooling coils for removal of the heat of reaction. The inlet points are placed in the tubes so that the heat released by the reaction taking place in a flow path flowing upwardly is substantially removed by the cooling coils and by the heat sink of the total mass flowing through the reactor. In this manner, excellent control over the temperature in the reactor is achieved. The total duty on the cooler is approximately $14.62 \times 10^6$ B.t.u./hr.

Although it is contemplated to use a hydrofluoric acid catalyst as described hereinabove, other suitable catalyst material such as sulfuric acid, mixtures of sulfuric acid and phosphoric acid, and hydrofluoric acid may also be utilized in my invention. However, it is distinctly preferable to use hydrofluoric acid, or hydrogen fluoride as the catalytic mass. As used herein, the term "hydrogen fluoride catalyst" is intended to include catalyst wherein hydrogen fluoride is the essential active ingredient. Thus, it is within the scope of this invention to employ substantially anhydrous hydrogen fluoride or hydrofluoric acid or hydrogen fluoride containing various additives or promoters such as boron trifluoride. Ordinarily, commercial hydrogen fluoride will be charged to the alkylation system as fresh catalyst. However, it is possible to use hydrogen fluoride containing as much as about 10% by volume water. Excessive dilution of water is generally undesirable since it tends to reduce the alkylating activity of the catalyst and introduces corrosion problems into the apparatus for effecting the alkylation.

As set forth hereinabove, when operating a hydrogen fluoride alkylation unit in the manner described above utilizing the process and apparatus of the present invention, an alkylate product having an end point below 400° F. and an octane number (F–1+3 cc. TEL per gallon of alkylate) of at least 105 is obtained with hydrogen fluoride catalyst consumption of less than 0.2 lb. of catalyst per barrel of alkylate produced. Additionally, significant economy of operation is achieved over the processing schemes taught by the prior art.

I claim as my invention:
1. A process for producing alkylated hydrocarbons which comprises the steps of:
   (a) admixing an olefin feed reactant with an isoparaffin feed reactant;
   (b) passing said admixture into a reaction zone comprising a vertically disposed enclosed shell having a separate tube sheet spaced from each end of the shell defining a separate space between each tube sheet and said shell, a plurality of tubular heat exchange means uniformly spaced and extending longitudinally within said shell, said tubular heat exchange means having the ends thereof extending through each tube sheet in fluid communication with said space between said tube sheet and said shell, first inlet means extending into a lower portion of said shell between said tube sheets, outlet means extending from an upper portion of said shell between said tube sheets, a plurality of conduits extending longitudinally in said shell between said tube sheets and being spaced in adjacent, parallel relationship with said heat exchange means, a second inlet means for introducing said admixture to said reaction zone, said second inlet means passing through said shell and communicating with said plurality of conduits at the upper ends thereof, said conduits having a plurality of openings longitudinally spaced in each of said conduits and arranged therein to form a series of consecutively advancing openings with each adjacent conduit whereby said admixture discharged from said openings forms a spiraling flow path;
   (c) introducing catalyst in liquid phase through said first inlet means under conditions sufficient to effect reaction between said reactants thereby creating an upwardly spiraling flow path of alkylated hydrocarbons around said heat exchange means;
   (d) withdrawing from said outlet means of said zone a reaction effluent comprising alkylated hydrocarbons, unreacted isoparaffin reactant and catalyst;
   (e) passing the effluent into the uppermost compartment of a multi-compartmented, vertically disposed vessel comprising at least an uppermost compartment for settling said effluent and a lower compartment for storing fresh catalyst, each of said compartments being located at an elevation above the reaction zone;
   (f) maintaining in said uppermost compartment conditions such that said effluent separates into a predominantly hydrocarbon phase containing alkylated hydrocarbons and a predominantly catalyst phase;
   (g) withdrawing from said uppermost compartment said hydrocarbon phase and said catalyst phase as separate streams; and,
   (h) returning said catalyst phase by gravity flow to said reaction zone as in step (c) without intervening cooling thereof.

2. A process according to claim 1 wherein said catalyst is hydrogen fluoride.

3. A process according to claim 1 wherein said catalyst is hydrogen fluoride, said openings are from $\frac{1}{16}$ inch to $\frac{3}{16}$ inch in diameter, and said admixture passes through the openings at a velocity of from about 5 to 55 feet per second.

4. The process according to claim 1 wherein said olefin comprises butylene.

5. A process according to claim 1 wherein said olefin comprises a mixture of propylene and butylene and the isoparaffin-to-olefin molar ratio is from about 1:1 to about 20:1.

6. A process for the production of an isoparaffin-olefin reaction product which comprises the steps of:
   (a) admixing an olefin feed reactant with isobutane to form an alkylation feed mixture comprising an isobutane-to-olefin molar ratio of from 1:1 to 20:1;
   (b) introducing said feed admixture into a reaction zone comprising a vertically disposed, enclosed shell having a separate tube sheet spaced from each end of the shell defining a separate space between each tube sheet and said shell, a plurality of tubular heat exchange means uniformly spaced and extending longitudinally within said shell, said tubular heat exchange means having the ends thereof extending through each tube sheet in fluid communication with said space between said tube sheet and said shell, first inlet means extending into a lower portion of said shell between said tube sheets, outlet means extending from an upper portion of said shell between said tube sheets, a plurality of conduits extending longitudinally in said shell between said tube sheets and being spaced in adjacent, parallel relationship with said heat exchange means, a second inlet means for introducing said alkylation feed mixture to said reaction zone, said second inlet means passing through said shell and communicating with said plurality of conduits at the upper ends thereof, said conduits having a plurality of openings longitudinally spaced in each of said conduits and arranged therein to form a series of consecutively advancing openings with each adjacent conduit whereby said alkylation feed mixture discharged from said openings forms a spiraling flow path;
   (c) passing hereinafter specified hydrogen fluoride catalyst into said reactor through said first inlet means thereby creating an upwardly spiraling flow path of alkylation feed mixture around said heat exchange means;
   (d) reacting said feed mixture in the presence of said catalyst under alkylation conditions including a catalyst-to-hydrocarbon volume ratio of from about 0.5 to 2.5;
   (e) removing a total effluent stream comprising said reaction product and said catalyst from said outlet means;
   (f) passing said total effluent into the uppermost compartment of a multi-compartmented, vertically disposed vessel comprising at least an upermost compartment for settling said effluent and a lower compartment for storing fresh catalyst, each of said compartments being located at an elevation above the reaction zone;
   (g) maintaining in said uppermost compartment conpartment conditions such that said effluent separates into a hydrocarbon phase containing said reaction product and a hydrogen fluoride catalyst phase;
   (h) withdrawing from said uppermost compartment said hydrocarbon phase and said catalyst phase as separate streams; and,
   (i) returning catalyst phase in an uninhibited, free-flowing manner to said reaction zone without intervening cooling thereof.

7. The process according to claim 6 wherein at least a portion of said stored catalyst is returned to said reaction zone as part of said alkylation conditions.

8. The process according to claim 6 wherein said olefin comprises butylene.

9. The process according to claim 6 wherein said olefin comprises a mixture of propylene and butylene.

References Cited

UNITED STATES PATENTS

| | | | |
|---|---|---|---|
| 2,603,591 | 7/1952 | Evans | 260—683.43 |
| 2,614,064 | 10/1952 | Carney | 260—683.43 |
| 2,937,079 | 5/1960 | Van Pool | 260—683.48 |
| 3,006,739 | 10/1961 | Van Pool | 260—683.48 |
| 3,108,048 | 10/1963 | McDonald | 260—683.48 |
| 3,249,649 | 5/1966 | Sherk et al. | 260—683.59 |

DELBERT E. GANTZ, Primary Examiner

G. J. CRASANAKIS, Assistant Examiner

U.S. Cl. X.R.

260—683.43